US010909423B2

(12) United States Patent
Connell et al.

(10) Patent No.: US 10,909,423 B2
(45) Date of Patent: Feb. 2, 2021

(54) GENERATING TRAINING DATA FOR MACHINE LEARNING CLASSIFIER

(71) Applicant: Microsoft Technology Licensing, LLC, Redmond, WA (US)

(72) Inventors: Trebor Lee Connell, Seattle, WA (US); Emanuel Shalev, Sammamish, WA (US); Michael John Ebstyne, Seattle, WA (US); Don Dongwoo Kim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 16/002,728

(22) Filed: Jun. 7, 2018

(65) Prior Publication Data
US 2019/0377980 A1    Dec. 12, 2019

(51) Int. Cl.
*G06K 9/62* (2006.01)
*G06N 20/00* (2019.01)
*G06K 9/00* (2006.01)

(52) U.S. Cl.
CPC ....... *G06K 9/6257* (2013.01); *G06K 9/00624* (2013.01); *G06N 20/00* (2019.01)

(58) Field of Classification Search
CPC ............. G06K 9/6257; G06K 9/00624; G06K 9/4661; G06K 9/6267; G06K 9/00201; G06K 9/6282; G06K 9/00664; G06K 9/00671; G06N 20/00; G06N 3/08; G06N 3/0454; G06N 3/0445; G06N 3/006; G06N 3/02; G06N 3/082; G06T 2207/20084;
(Continued)

(56) References Cited

U.S. PATENT DOCUMENTS

| 7,301,547 | B2 | 11/2007 | Martins et al. |
| 8,838,511 | B2 | 9/2014 | Kristal et al. |
| 10,235,601 | B1 * | 3/2019 | Wrenninge .......... G06K 9/6256 |
| 10,403,285 | B1 * | 9/2019 | Gleason .................. G06F 3/012 |

(Continued)

FOREIGN PATENT DOCUMENTS

DE    102008057979 A1    5/2010

OTHER PUBLICATIONS

Charalambous, et al., "A data augmentation methodology for training machine/deep learning gait recognition algorithms", In Proceedings of the British Machine Vision Conference, Sep. 19, 2016, pp. 1-12.
(Continued)

*Primary Examiner* — Xilin Guo
(74) *Attorney, Agent, or Firm* — Alleman Hall; Creasman & Tuttle LLP

(57) ABSTRACT

Data representing a scene is received. The scene includes labeled elements such as walls, a floor, a ceiling, and objects placed at various locations in the scene. The original received scene may be modified in different ways to create new scenes that are based on the original scene. These modifications include adding clutter to the scene, moving one or more elements of the scene, swapping one or more elements of the scene with different labeled elements, changing the size, color, or materials associated with one or more of the elements of the scene, and changing the lighting used in the scene. Each new scene may be used to generate labeled training data for a classifier by placing a virtual sensor (e.g., a camera) in the new scene, and generating sensor output data for the virtual sensor based on its placement in the new scene.

20 Claims, 9 Drawing Sheets

(58) Field of Classification Search
CPC ......... G06T 2207/20081; G06T 19/006; G06T 15/506; G06T 15/50; G06T 19/20; G06T 7/11; G06T 15/00
See application file for complete search history.

(56) References Cited

U.S. PATENT DOCUMENTS

| | | | |
|---|---|---|---|
| 2010/0302245 A1* | 12/2010 | Best | G06T 19/00 345/426 |
| 2012/0288186 A1 | 11/2012 | Kohli et al. | |
| 2016/0342861 A1 | 11/2016 | Tuzel et al. | |
| 2017/0251172 A1* | 8/2017 | McNelley | H04N 7/142 |
| 2019/0043243 A1* | 2/2019 | Chui | G06K 9/4671 |

OTHER PUBLICATIONS

Chen, et al., "Synthesizing Training Images for Boosting Human 3D Pose Estimation", In Proceedings of Fourth International Conference on 3D Vision, Oct. 25, 2016, 3 Pages.

Georgakis, et al., "Synthesizing Training Data for Object Detection in Indoor Scenes", In Journal of the Computing Research Repository, Feb. 2017, 9 Pages.

Handa, et al., "Understanding Real World Indoor Scenes with Synthetic Data", Proceedings of the IEEE Conference on Computer Vision and Pattern Recognition, Jun. 27, 2016, pp. 4077-4085.

Rogez, et al., "MoCap-guided Data Augmentation for 3D Pose Estimation in the Wild", In Journal of the Computing Research Repository, Jul. 2016, 9 Pages.

Westphal, Susanne, "Using synthetic data for deep learning video recognition", Retrieved From https://medium.com/twentybn/using-synthetic-data-for-deep-learning-video-recognition-49be108a9346, Retrieved on: Mar. 27, 2018, 8 Pages.

Wong, et al., "Understanding Data Augmentation for Classification: When to Warp?", In Proceedings of International Conference on Digital Image Computing: Techniques and Applications, Nov. 30, 2016, 6 Pages.

"International Search Report and Written Opinion Issued in PCT Application No. PCT/US2019/033639", dated Sep. 2, 2019, 10 Pages.

* cited by examiner

900

GENERATING TRAINING DATA FOR MACHINE LEARNING CLASSIFIER

BACKGROUND

Machine learning classifiers can be used to identity and recognize objects in sensor data representing three-dimensional scenes. For example, a classifier can be trained to identify objects such as furniture in sensor data received from a video camera. In another example, a classifier can be trained to identify faces in sensor data received from an infrared camera. In another example, a classifier can be trained to identify objects based on sounds as captured by a microphone or a sound sensor. As may appreciated, machine learning classifiers have a multitude of uses in a variety of fields such as security, shopping, and self-driving vehicles.

While machine learning classifiers are useful, they require a large amount of data to train. Typically, a machine learning classifier is trained on sensor data that has been labeled by a user. For example, a machine learning classifier that recognizes furniture may be trained by providing the classifier various images that are known to include chairs. To ensure that the classifier is robust and able to recognize a variety of chairs in a variety of conditions, the images used to train the classifier may be taken from a variety of different locations, a variety of different perspectives, and a variety of different lighting conditions. Accordingly, a large number of images may be required. Because each image may be reviewed and labeled by hand, collecting and labeling enough images to sufficiently train a classifier may be time consuming and expensive.

SUMMARY

Data representing a three-dimensional scene is received. The scene includes elements such as walls, a floor, a ceiling, and objects such as furniture and art placed at various locations in the scene. Data for each scene element includes position and orientation within the scene, and may include shape (geometric) and material representations. Some or all of the elements of the scene may be labeled. The original scene may be modified in different ways to create new derivative scenes that are based on the original scene. These modifications include adding clutter to the scene, moving one or more elements of the scene, swapping one or more elements of the scene with different labeled elements, changing the size, color, or materials associated with one or more of the elements of the scene, and changing the lighting used in the scene. Each derivative scene may be used to generate labeled training data for a classifier by placing a virtual sensor (e.g., a camera) in the derivative scene, and generating sensor data for the virtual sensor based on its placement in the derivative scene.

In an implementation, a system for generating training data for machine learning classifiers is provided. The system includes: at least one computing device; and a training engine that: receives a first scene, wherein the first scene includes a plurality of elements, and each element is associated with a label; generates a second scene from the first scene by performing one or more of: changing a lighting characteristic of the first scene; adding one more elements to the plurality of elements of the first scene; and changing a characteristic of one or more elements of the plurality of elements of the first scene; generates training data from the second scene; and trains a machine learning classifier using the generated training data.

In an implementation, a system for generating training data for machine learning classifiers is provided. The system comprises: at least one computing device; and a training engine that: receives a scene, wherein the scene includes a plurality of elements, and each element is associated with a label; changes a lighting characteristic of the scene; changes a characteristic of one or more elements of the plurality of elements of the scene; adds a new element to the plurality of elements of the scene, wherein the new element is associated with a label; places a virtual sensor in a location of the scene; generates sensor data for the virtual sensor based on the location of the virtual sensor in the scene; and generates training data based on the generated sensor data and the labels associated with the elements of the plurality of elements of the scene.

In an implementation, a method for generating training data for machine learning classifiers is provided. The method includes: receiving a scene by a computing device, wherein the scene includes a plurality of elements, and each element is associated with a label; changing a lighting characteristic of the scene by the computing device; changing a characteristic of one or more elements of the plurality of elements of the scene by the computing device; adding a new element to the plurality of elements of the scene by the computing device, wherein the new element is associated with a label; generating training data based on the scene by the computing device; and providing the generated training data.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
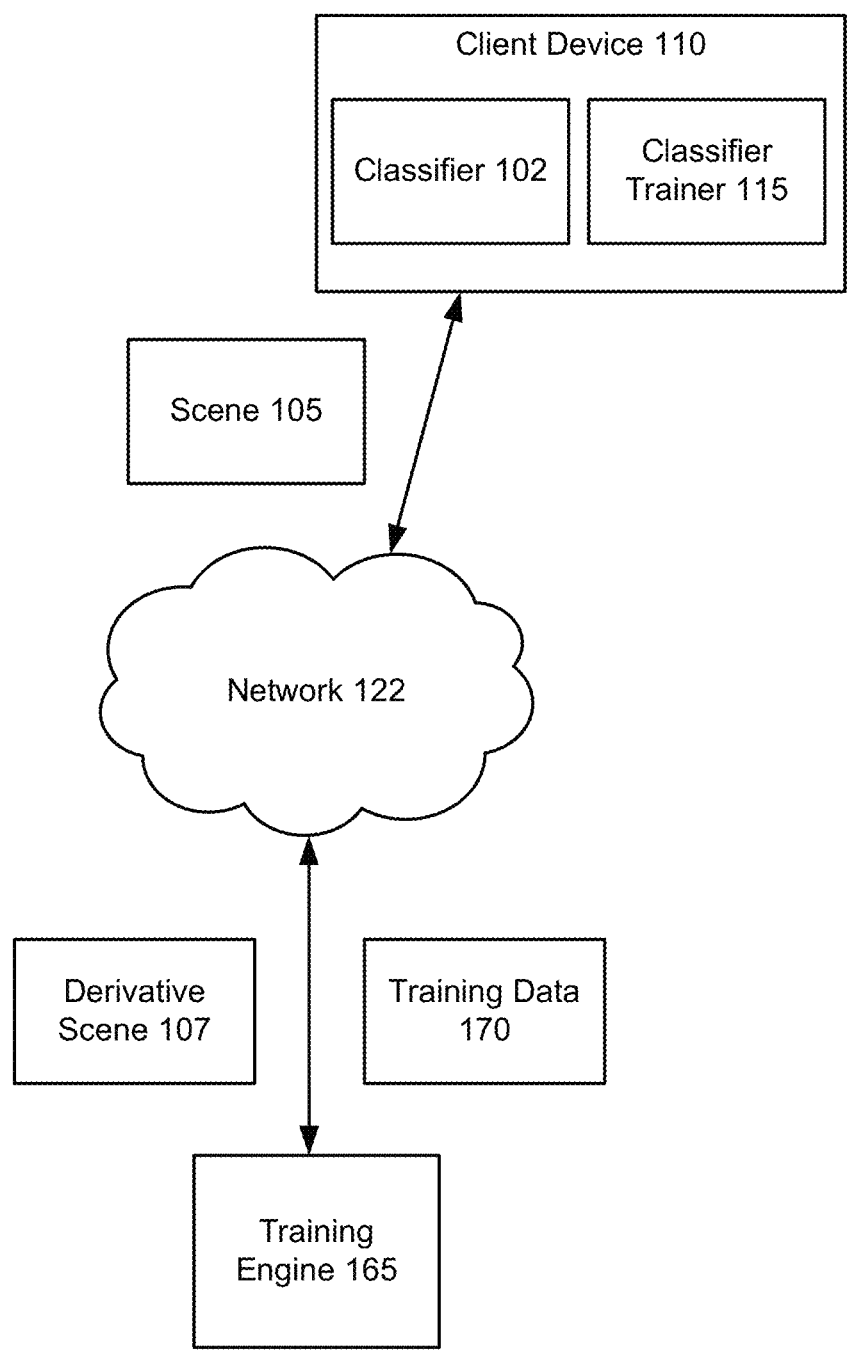
FIG. 1 is an illustration of an exemplary environment for creating training data for machine learning classifiers.

FIG. 1 is an illustration of an exemplary environment for creating training data for machine learning classifiers. The environment 100 may include a training engine 165 and one or more client devices 110 in communication through a network 122. The network 122 may be a variety of network types including the public switched telephone network (PSTN), a cellular telephone network, and a packet switched network (e.g., the Internet). Although only one client device 110 and one training engine 165 are shown in FIG. 1, there is no limit to the number of client devices 110 and training engines 165 that may be supported.

Figure 9:
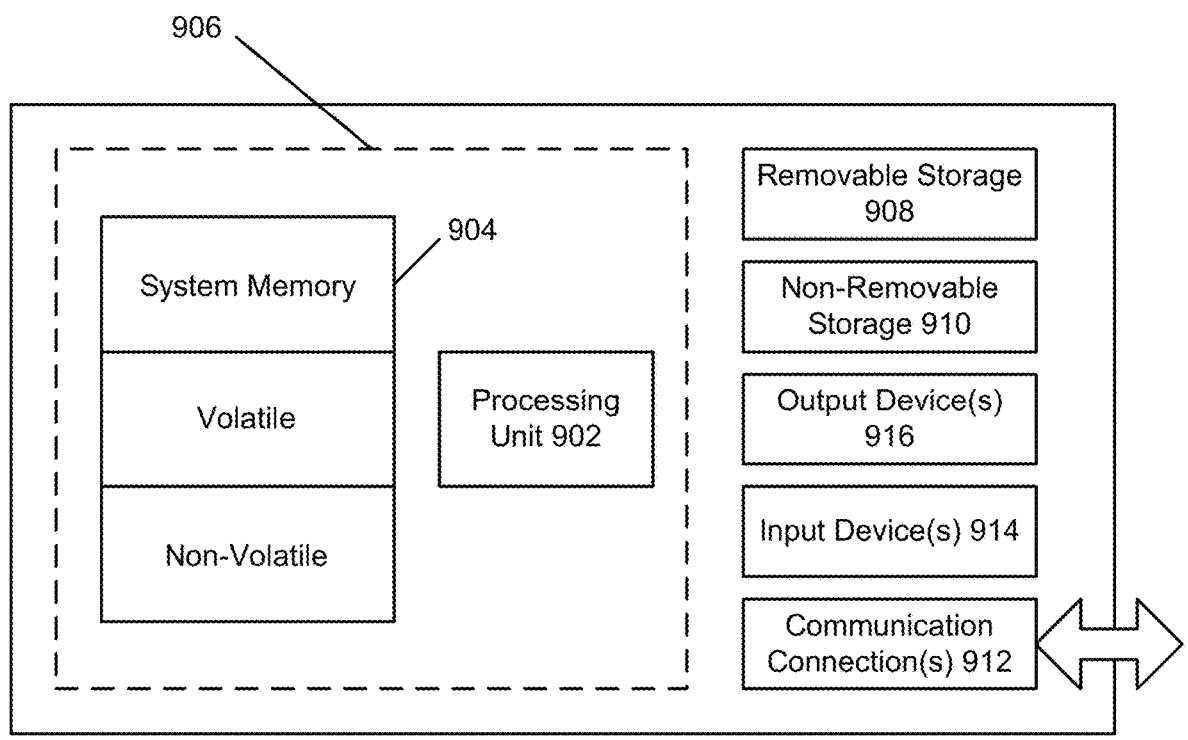
FIG. 9 shows an exemplary computing environment in which example embodiments and aspects may be implemented.

The client device 110 and the training engine 165 may be implemented together or separately using a variety of computing devices such as smartphones, desktop computers, laptop computers, tablets, head mounted display devices, set top boxes, vehicle navigation systems, and videogame consoles. Other types of computing devices may be supported. A suitable computing device is illustrated in FIG. 9 as the computing device 900.

The client device 110 may execute a classifier trainer 115. The classifier trainer 115 may train a classifier 102. The classifier 102 may be a machine learning classifier 102 and may be trained by the classifier trainer 115 to recognize one or more elements in sensor data. For example, a classifier 102 may be trained by the classifier trainer 115 to recognize elements such as objects in sensor data generated by a sensor such as a video camera. Other types of elements and/or types of sensors and sensor data may be supported. Depending on the implementation, the sensor may be a human worn sensor.

The classifier trainer 115 may train the classifier 102 using training data 170. The training data 170 may include sensor data received from a sensor and one or more labels. Depending on the implementation, each label may be associated with pixels or regions in the sensor data and may identify the element that is represented by the associated pixels or regions. Continuing the example above, the training data 170 may include sensor data such as a picture of a room, and the labels may identify the particular objects or elements that each pixel or region of the sensor data represents in the room. Thus, a picture of a room may have pixels or regions labeled "chair", "wall", "rug", or "floor", for example, depending on the elements in the room depicted by the picture.

As described above, one problem associated with classifiers 102 is that they use a large amount of training data 170 to operate correctly. Because each piece of sensor data may be labeled by hand, creating and labeling enough training data 170 to adequately train a classifier 102 may be time consuming and expensive.

In order to solve the problems associated with classifiers 102 and training data 170, the environment 100 may further include a training engine 165. The training engine 165 may receive a scene 105, and may generate training data 170 from the scene 105. The scene 105 may represent a room or other environment, and may include a plurality of elements placed in the scene 105. These elements may include, for example, walls, floors, ceilings, as well as objects such as chairs, desks, art, rugs, etc. Each element may have characteristics such as a location or position in the scene, color, size, texture, etc. Other types of elements and/or characteristics may be supported.

The scene 105 may be generated by a user of the client device 110, or may be generated automatically by a computer. For example, a computer may select and place the various elements in a scene 105, or a user may select elements from a list of elements and may place and/or arrange the elements in the scene 105. Because the placed elements are known to the user or the computer, each element may be associated with a preexisting label.

The training engine 165 may use the scene 105 to generate a large amount of training data 170. As described further below, the training engine 165 may make small changes or adjustments to the characteristics of the elements in the scene 105, may add new elements to the scene 105, or may change lighting characteristic of the scene 105, to generate one or more derivative scenes 107 that preserve the original labeling from the original scene 105. Virtual sensors, such as cameras, may then be placed in various locations of the derivative scenes 107, and may be used to generate sensor data for each derivative scene 107. Because the elements in the derivative scene 107 preserve the labeling from the original scene 105, the generated sensor data can be labeled using the labeling of the original scene 105 and can be provided to the classifier trainer 115 as training data 170.

As may be appreciated, a single scene 105 can be used to easily and quickly generate a large number of derivative scenes 107. Each derivative scene 107 may be further used to generate a large amount of training data 170 by repeatedly changing the placement of virtual sensors in the derivative scene 107, and generating new training data 170 for each new placement. Because each derivative scene 107 is quickly generated from the scene 105, and uses the original labeling of scene 105, the cost and time used to generate training data 170 to train a classifier 102 is greatly reduced.

Figure 2:
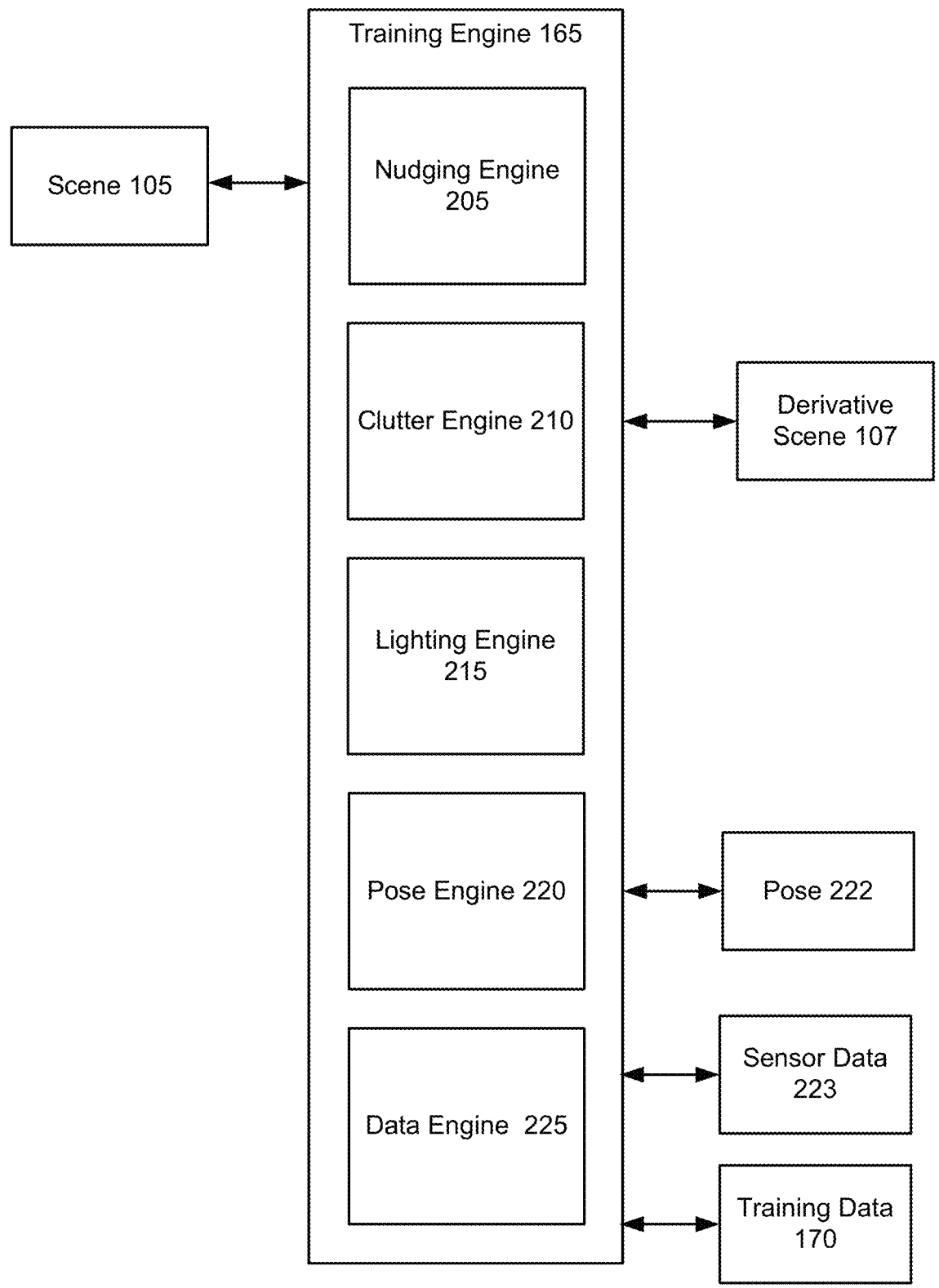
FIG. 2 is an illustration of an implementation of an exemplary training engine.

FIG. 2 is an illustration of an implementation of an exemplary training engine 165. The training engine 165 may include one or more components including a nudging engine 205, a clutter engine 210, a lighting engine 215, a pose engine 220, and a data engine 225. More or fewer components may be included in the training engine 165. Some or all of the components of the training engine 165 may be implemented by one or more computing devices such as the computing device 900 described with respect to FIG. 9. In addition, some or all of the functionality attributed to the training engine 165 may be performed by the client device 110, or some combination of the client device 110 and the training engine 165.

The nudging engine 205, the clutter engine 210, and the lighting engine 215, may together, or separately, generate one or more derivative scenes 107 from a scene 105. The nudging engine 205 may generate a derivative scene 107 from a scene 105 by changing locations or positions of one or more elements of the scene 105. For example, the nudging engine 205 may select an element such as a chair in the scene 105, and may change its location or position in the scene 105 to create the derivative scene 107. The one or more elements may be selected by a user, or automatically by the nudging engine 205. Depending on the implementation, an amount that the location or position of an element is changed in the scene 105 may be controlled by a nudging model.

The nudging engine 205 may further generate a derivative scene 107 from a scene 105 by changing characteristics of one or more elements of the scene 105. The characteristics may include color, texture, size, etc. Other characteristics may be supported. For example, the nudging engine 205 may select an element such as a table in the scene 105, and may change its color from brown to black. In another example, the nudging engine 205 may select an element such as a bowl in the scene 105, and may increase or decrease its size relative to the other elements in the scene 105. The characteristics and/or elements may be selected by a user, or automatically by the nudging engine 205.

The nudging engine 205 may further generate a derivative scene 107 from a scene 105 by replacing one or more elements of the scene 105 with one or more other elements. The replacing elements may have known labels. For example, the nudging engine 205 may replace an element such as a painting with a different painting. In another example, the nudging engine 205 may replace an element such as a chair with a stool. The replacing elements may come from a library or collection of elements with known or associated labels. The elements may be selected and replaced by a user, or automatically by the nudging engine 205.

The clutter engine 210 may generate a derivative scene 107 from a scene 105 by adding one or more elements to the scene 105. The added elements may be added to clutter the derivative scene 107, and to possibly obscure one or more of the other elements of the derivative scene 107. For example, the clutter engine 210 may clutter the derivative scene 107 by placing several cubes, spheres, or other shapes into the derivative scene 107. Depending on the implementation, each element added to the derivative scene 107 may have an associated label. The particular elements, and the number of elements, that are added by the clutter engine 210 may be selected by a user, or may be automatically selected by the clutter engine 210.

The lighting engine 215 may generate a derivative scene 107 from a scene 105 by changing one or more lighting characteristics associated with the scene 105. Depending on the implementation, the lighting characteristics of the scene 105 may include the number and locations of light sources in the scene 105, the intensity, brightness, and temperature of the light sources in the scene 105, and the types (e.g., incandescent, fluorescent, or LED) of the light sources in the scene 105. The lighting characteristics may further include the time of day or night associated with the scene 105. The particular lighting characteristics that are changed in the scene 105 by the lighting engine 210 may be selected by a user, or may be automatically selected by the lighting engine 210.

As may be appreciated, the nudging engine 205, the clutter engine 210, and the lighting engine 215 may work together, or separately, to create a large number of derivative scenes 107 from a single scene 105. As an example of working together, the nudging engine 205 may modify the scene 105 to create a derivative scene 107 by moving an element such as a vase in the scene 105. The clutter engine 210 may further add random elements to the derivative scene 107 created by the nudging engine 205. Finally, the lighting engine 215 may further modify the derivative scene 107 by adding one more new light sources to the scene 107. The various engines may repeat the process for each new derivative scene 107.

As an example of working separately, the nudging engine 205 may generate one or more derivative scenes 107 by moving different elements of the scene 105. The clutter engine 210 may separately generate one or more derivative scenes 107 by randomly adding different elements and numbers of elements to the scene 105. The lighting engine 215 may separately generate one or more derivative scenes 107 by randomly changing the lighting characteristics of the scene 105.

Regardless of how they are generated, the derivative scenes 107 use the labels from the original scene 105, and therefore no additional labeling is needed for each derivative scene 107. Because labeling is often done by human reviewers when training classifiers 102, avoiding additional labeling can greatly reduce both time and costs associated with training.

The pose engine 220 may generate one or more poses 222 from each generated derivative scene 107. As used herein, a pose 222 refers to the placement and/or location of a virtual sensor in a derivative scene 107. The virtual sensors may include sensors such as cameras (visible light, infrared, etc.) and microphones. Other types of sensors may be supported. In general, the placement and/or location of the virtual sensor in the derivative scene 107 may be selected to correspond to a perspective of a human viewer or a wearer of the virtual sensor.

The pose engine 220 may use the virtual sensor and the derivative scene 107 to generate sensor data 223. The format of the sensor data 223 may depend on the type of virtual sensor used in the pose 222. For example, for a virtual sensor that is a camera, the sensor data 223 may be an image. Other sensor data 223 formats may be supported.

As may be appreciated, the pose 222 used for a virtual sensor in a derivative scene 107 may control which elements of the derivative scene 107 are captured or indicated in the resulting sensor data 223. For example, a pose 222 associated with a high position in the derivative scene 107 may result in sensor data 223 that captures more elements than a pose 222 associated with a low position in the derivative scene 107.

In some implementations, the pose engine 220 may randomly select the poses 222 used for a derivative scene 107. In other implementations, the pose engine 220 may select the poses 222 using an algorithm that maximizes a number of elements that are captured in the resulting sensor data 223, or that maximizes a number of "interesting" elements that are captured in the resulting sensor data 223. An element such as an object may be considered more interesting than an element such as a wall or floor when training a classifier 102. What constitutes an interesting element may depend on the type and/or purpose of the classifier 102.

Alternatively, some or all of the poses 222 may be generated by a user or an administrator placing the virtual sensor into the derivative scene 107. The number of poses 222 generated for each derivative scene 107 may be set by the user or the administrator.

The data engine 225 may generate training data 170 based on the sensor data 223 generated for each pose 222. The generated training data 170 may include the sensor data 223 and the labels associated with the elements of the derivative environment 107 that are captured in the sensor data 223. Depending on the implementation, the data engine 225 may label each pixel of the sensor data 223 according to the element that is depicted by the pixel. Other types of labels may be supported. The data engine 225 may provide the generated training data 170 to the classifier trainer 115 which may use the training data 170 to train one or more classifiers 102.

Figure 3:
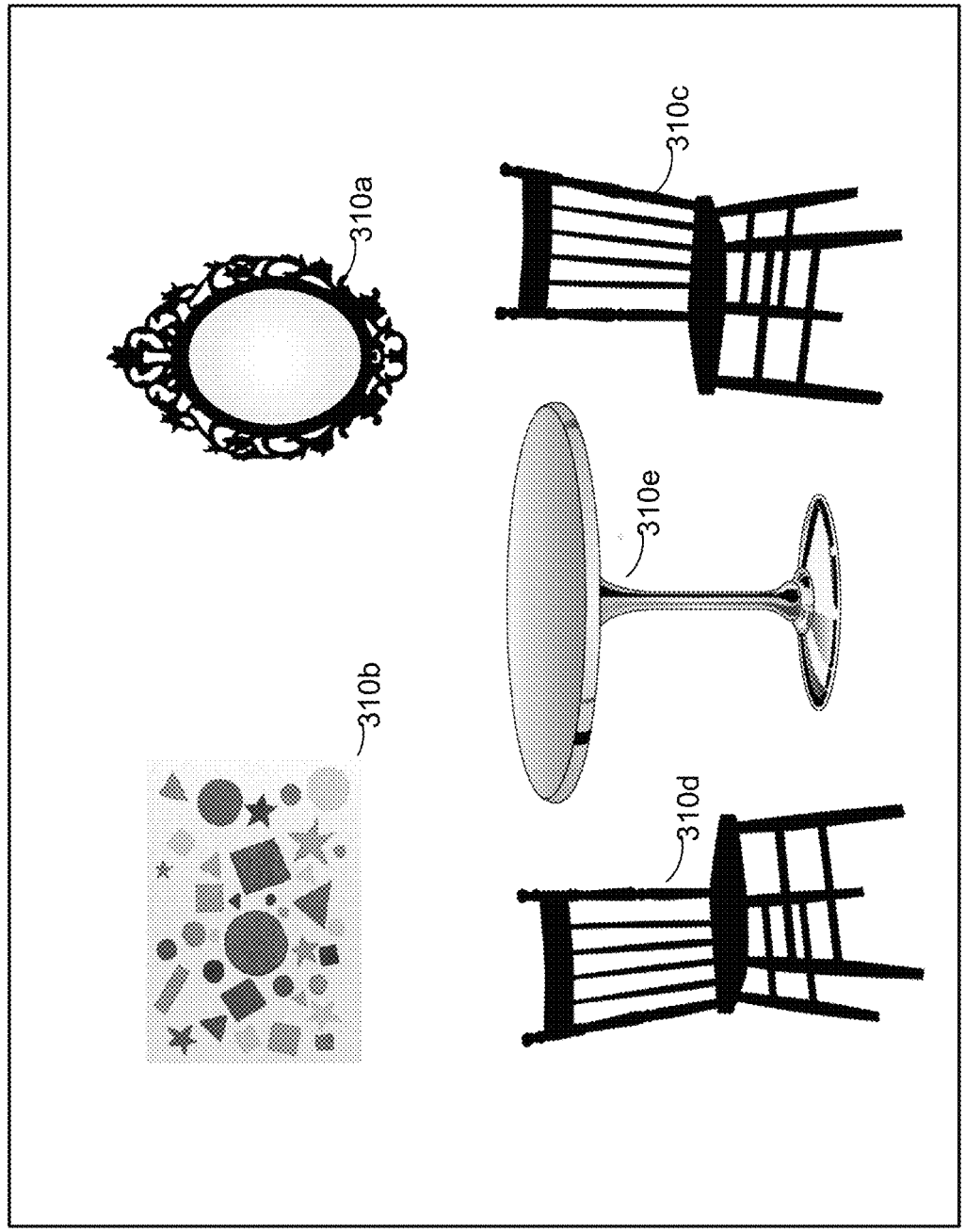
FIG. 3 is an illustration of an example scene.

FIG. 3 is an illustration of an example scene 300. The scene 300 is a representation of a room and includes several elements 310 (i.e., the elements 310a-e). The element 310a is a mirror object. The element 310b is a painting object. The elements 310c and 310d are chair objects. The element 310e is a table object. While not illustrated, the scene 300 may include other elements such as walls, a floor, and a ceiling.

The scene 300 may have been generated by a user or a computer for purposes of generating training data 170 for a classifier 102. Accordingly, each of the elements 310 may have a label that identifies it to the classifier 102. In order to generate a large amount of training data 170 from the scene 300, the training engine 165 may generate multiple derivatives scenes 107 by performing one or more of element nudging, element cluttering, or changing one more lighting characteristics of the scene 300. The elements of the derivative scene 107 may retain some or all of the labels from the scene 300.

Figure 4:
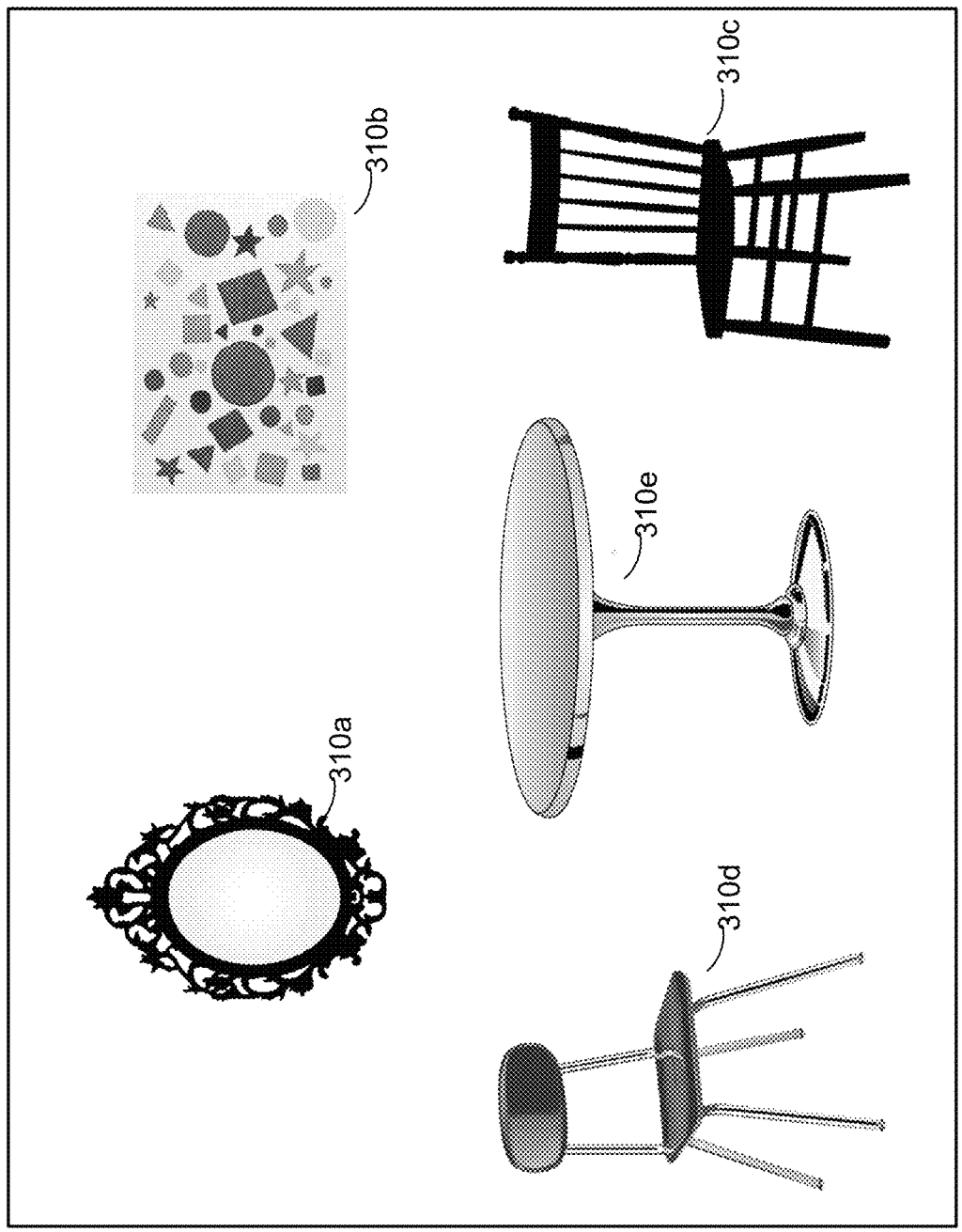
FIGS. 4-6 are illustrations of example derivative scenes.

FIG. 4 is an illustration of an example derivative scene 400 generated from the scene 300. The derivative scene 400 may have been generated by the nudging engine 205 making one or more changes to the characteristics or locations of the elements 310 of the scene 300.

In the example shown, the nudging engine 205 has swapped the location of the element 310*a* with the element 310*b* in the derivative scene 400. The nudging engine 205 has further changed the location of the element 310*c* in the derivative scene 400 by moving the corresponding chair object to the right. In addition, the nudging engine 205 has replaced the chair object corresponding to the element 310*d* in the derivative scene 400 with a different chair object. The various changes made to the elements 310 by the nudging engine 205 may have been made by a user or an administrator, or may have been automatically made by the nudging engine 205.

Figure 5:
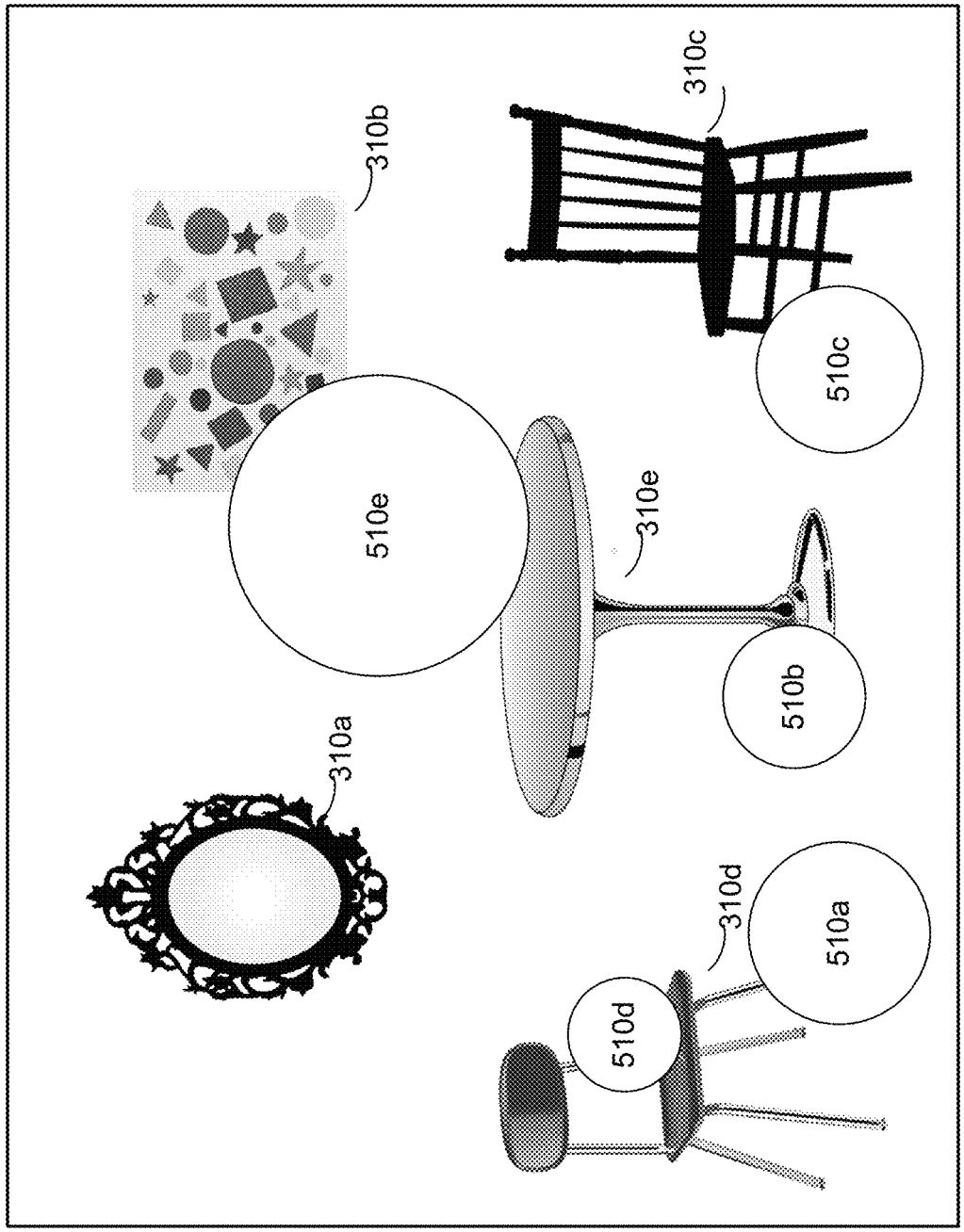

Continuing to FIG. 5, the derivative scene 400 may be further modified by the clutter engine 210. The clutter engine 210 has added several elements 510 (i.e., the elements 510*a-e*) to clutter the derivative scene 400. In the example shown, the elements 510 have been placed by the clutter engine 210 in the derivative scene 400 to partially obscure at least some of the elements 310. For example, the element 310*d* is partially obscured by the elements 510*a* and 510*d*. The element 310*b* is partially obscured by the element 510*e*. The element 310*e* is partially obscured by the elements 510*b* and 510*e*. The element 310*c* is partially obscured by the element 510*c*.

As shown in FIG. 5, the elements 510 placed by the clutter engine 210 into the derivative scene 400 are spheres of various sizes. However, other shapes and elements may be placed by the clutter engine 210. The number, shape, location, and other characteristics of each element 510 may be specified by a user. Alternatively, the characteristics of each element 510 may be automatically specified by the clutter engine 210.

Figure 6:
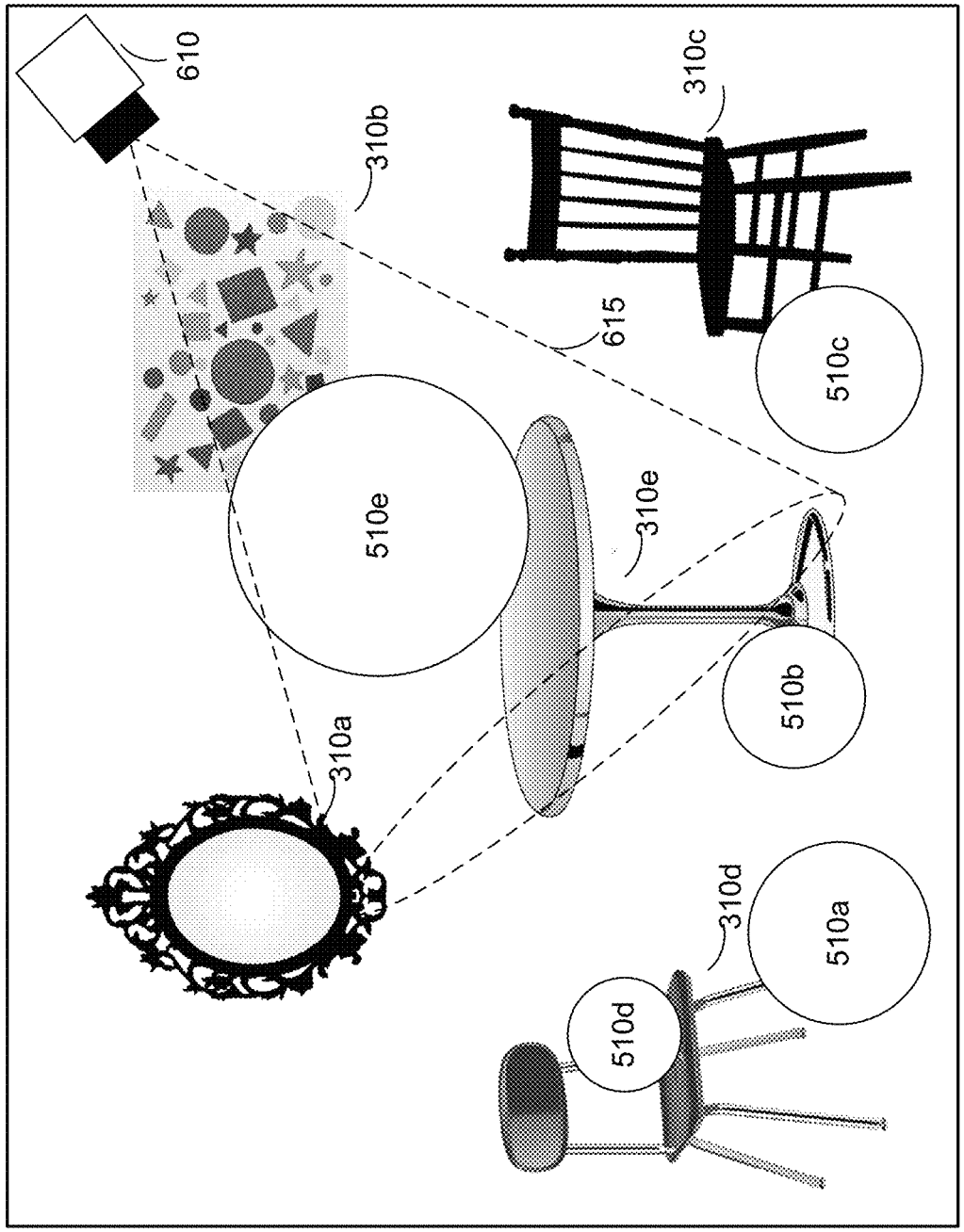

Continuing to FIG. 6, after adjusting one or more lighting characteristics of the derivative scene 400 by the lighting engine 215, the pose engine 220 may use the derivative scene 400 to generate one or more poses 222. In the example shown, the pose engine 220 has placed a virtual sensor 610 (e.g., a camera) into the derivative scene 400. A cone 615 shown using dotted lines represents the area of the derivative scene 400 that is captured by the virtual sensor 610 and includes the elements 310 and 510 that will become part of the subsequent sensor data 223 generated by the virtual sensor 610. The virtual sensor 610 may have been placed by a user, or may have been placed automatically by the pose engine 220.

Figure 7:
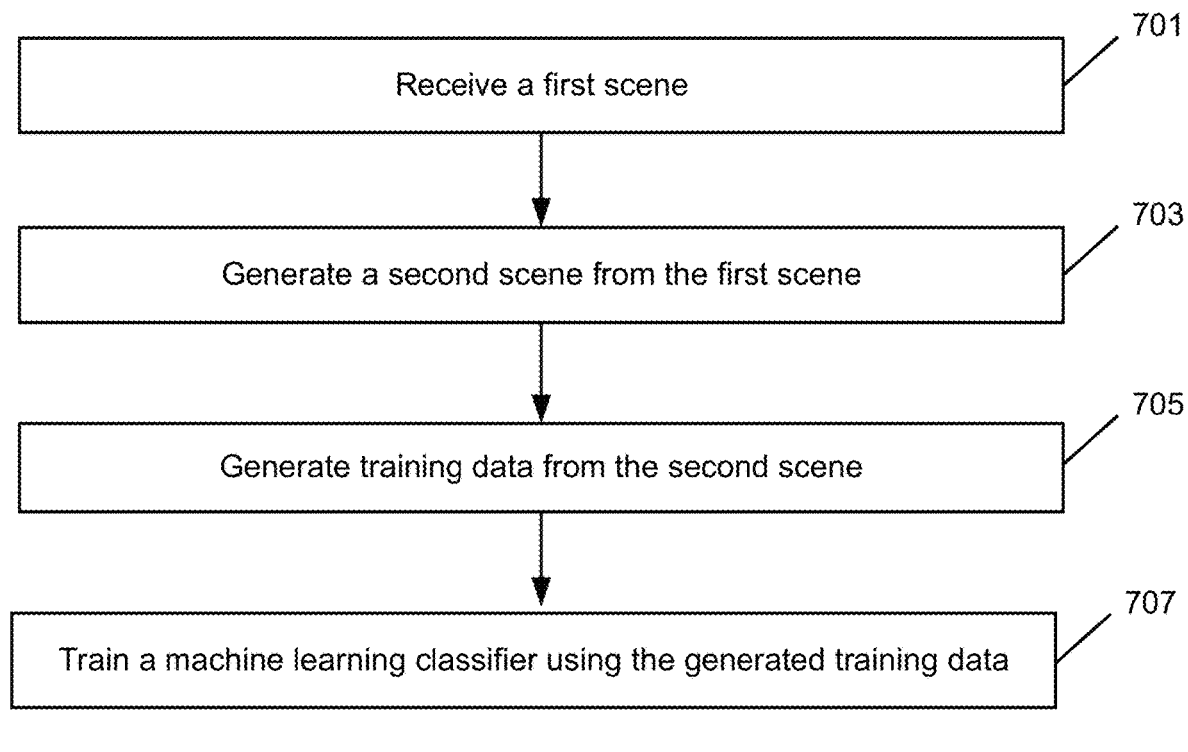
FIG. 7 is an operational flow of an implementation of a method for generating training data to train a machine learning classifier.

FIG. 7 is an operational flow of an implementation of a method 700 for generating training data to train a machine learning classifier. The method 700 may be implemented by the training engine 165.

At 701, a first scene is received. The first scene 105 may be received by the training engine 165. The first scene 105 may include a plurality of elements such as walls, floors, ceilings, and objects. Other elements may be supported. Some or all of the elements in the plurality of elements may have a label that indicates what type of element it is. The first scene 105 may have been automatically generated by a computer or may have been generated by a user.

At 703, a second scene is generated from the first scene. The second scene may be generated from the first scene 105 by one or all of the nudging engine 205, the clutter engine 210, and the lighting engine 215 of the training engine 165. The second scene is also referred to as the derivative scene 107. The second scene may also have a plurality of elements, and may preserve some or all of the labels from the first scene 105.

In some implementations, the second scene may be generated from the first scene 105 by performing one or more of moving or changing a characteristic or location of one or more of the elements of the plurality of elements (i.e., nudging), adding one or more elements to the plurality of elements (i.e., cluttering), and changing one or more lighting characteristics or conditions of the first scene 105. Other methods for generating a second scene from a first scene 105 may be used. Depending on the implementation, multiple second scenes may be generated from the first scene 105.

At 705, training data is generated from the second scene. The training data 170 may be generated by the pose engine 220 and/or the data engine 225 of the training engine 165. In some implementations, the pose engine 220 may generate a pose 222 by placing a virtual sensor, such as a camera, into the second scene. The virtual sensor may be placed to mimic the perspective of a human that is wearing the virtual sensor. The pose engine 220 may generate sensor data 223 for the virtual sensor based on the placement of the virtual sensor in the second scene. The generated sensor data 223 may be labeled by the data engine 225 based on the labels associated with the elements of second scene that are captured in the sensor data 223, and may be provided by the data engine 225 as the training data 170.

Depending on the implementation, multiple different poses 222 may be generated for each of the generated second scenes. Each of the poses 222 may be used to generate training data 170.

At 707, a machine learning classifier is trained using the generated training data. The machine learning classifier 102 may be trained by the classifier trainer 115 using the training data 170 provided by the data engine 225.

Figure 8:
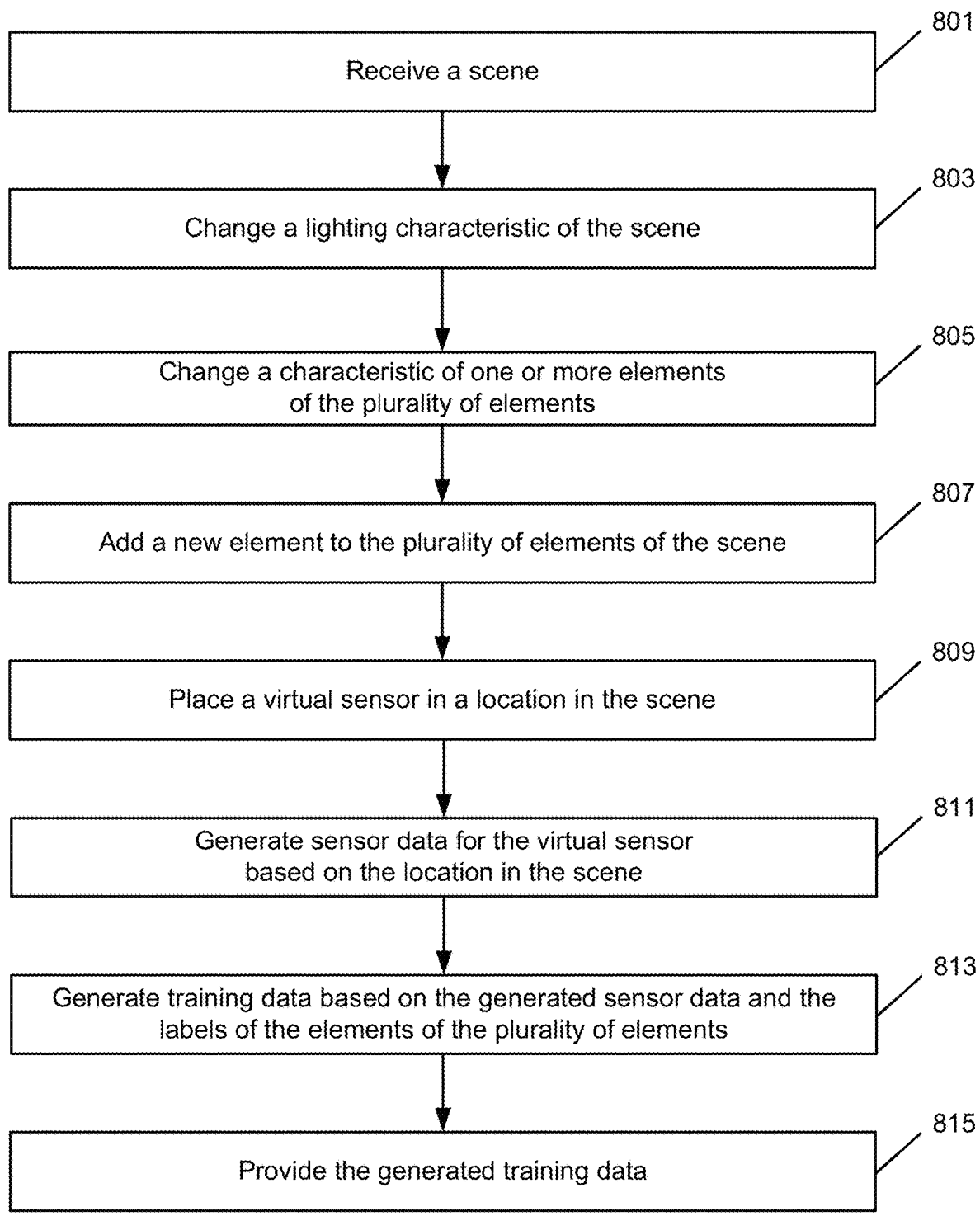
FIG. 8 is an operational flow of an implementation of a method for generating training data to train a machine learning classifier.

FIG. 8 is an operational flow of an implementation of a method 800 for generating training data to train a machine learning classifier. The method 800 may be implemented by the training engine 165.

At 801, a scene is received. The scene 105 may be received by the training engine 205. The scene 105 may have been generated by a user, or automatically by a computing device. The scene 105 may include a plurality of elements such as walls, ceilings, and objects. Each element may have a label that identifies the element. Each element may further have a location or placement in the scene 105.

At 803, a lighting characteristic of the scene is changed. The lighting characteristic of the scene 105 may be changed by the lighting engine 215 of the training engine 165. Depending on the implementation, changing the lighting characteristic of the scene 105 may include one or more of changing a temperature, location, shape, and intensity of a light source associated with the scene 105, removing a light source from the scene 105, and adding a light source to the scene 105. The lighting characteristic may be selected and changed based on user input, or may be changed automatically without user selection by the lighting engine 215.

At 805, a characteristic of one or more elements of the plurality of elements is changed. The characteristics of one or more elements of the plurality of elements may be changed by the nudging engine 205 of the training engine 165. The characteristics of an element of the plurality of elements may include the color, texture, position, and orientation of the element. Other characteristics may be supported. The characteristics of the one or more elements of the plurality of elements may be selected and changed based on user input, or may be changed automatically by the nudging engine 205 without user selection.

At 807, a new element is added to the scene. The new element may be added to the plurality of elements associated with the scene 105 by the clutter engine 210 of the training engine 205. The new element added to the scene 105 may have a label and may be selected from a library of elements. Depending on the implementation, the new element may, or may not, replace an existing element in the scene 105. Depending on the implementation, the new element may be placed at a location in the scene 105 to obscure one or more other elements of the scene 105. The number, type, and location of each new element added to the scene 105 may be determined by a user, or may be determined randomly by the clutter engine 210.

At 809, a virtual sensor is placed in a location in the scene. The virtual sensor may be placed by the pose engine 220. Depending on the implementation, the virtual sensor may be a camera. The scene 105 with the placed virtual sensor is referred to as a pose 222. The pose engine 220 may generate multiple poses 222 from the scene 105 by changing the location of the virtual sensor in the scene 105 for each pose 222. Depending on the implementation, the location of the virtual sensor in each pose 222 may be randomly selected by the pose engine 220, or may be selected according to one or more algorithms. For example, the pose engine 220 may place the virtual sensor in a location in the scene 105 that maximizes the number of elements that are visible in the pose 222, or that maximizes a number of "interesting" elements (e.g., objects) that are visible in the pose 222. Other methods for selecting virtual sensor locations may be used.

At 811, sensor data is generated for the virtual sensor based on the location in the scene. The sensor data 223 may be generated by the pose engine 225 of the training engine 165 based on the location of the virtual sensor in the scene 105. The generated sensor data 223 may depend on the type of virtual sensor. Any method for generating sensor data 223 for a virtual sensor may be used. Depending on the implementation, sensor data 223 may be generated for each pose 222.

At 813, training data is generated based on the generated sensor data and labels of the elements of the plurality of elements. The training data 170 may be generated by the data engine 225 of the training engine 165. The training data 170 may include the sensor data 223 generated for each pose 222 and may include the labels for any elements that are included in the sensor data 223. For example, for sensor data 223 generated by a camera virtual sensor, the training data 170 may include labels for any elements that are visible in the sensor data 223. Any method for generating sensor data 223 may be used.

At 815, the generated training data is provided. The generated training data 170 may be provided by the data engine 170. The generated training data 170 may be provided to one or more classifier trainers 115 to train one or more machine learning classifiers 102.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/ functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for generating training data for machine learning classifiers is provided. The system includes: at least one computing device; and a training engine that: receives a first scene, wherein the first scene includes a plurality of elements, and each element is associated with a label; generates a second scene from the first scene by performing one or more of: changing a lighting characteristic of the first scene; adding one more elements to the plurality of elements of the first scene; and changing a characteristic of one or more elements of the plurality of elements of the first scene; generates training data from the second scene; and trains a machine learning classifier using the generated training data.

Implementations may include some or all of the following features. Changing a lighting characteristic of the first scene may include one or more of changing a temperature, a location, a shape, and an intensity of a light source associated with the first scene, removing a light source from the first scene, and adding a light source to the first scene. Changing a characteristic of one or more elements of the plurality of elements of the first scene may include changing one or more of a size, a location, an orientation, a color, and a texture of one or more elements of the plurality of elements. Adding one or more elements to the plurality of elements may include randomly adding the one or more elements to the plurality of elements. The training engine generating the training data from the generated second scene may include the training engine: placing a virtual sensor in a location in the second scene; generating sensor data for the virtual sensor based on the location of the virtual sensor in the second scene; and generating the training data using the sensor data and the labels associated with the elements of the plurality of elements of the second scene. The virtual sensor may be a camera. The training engine may select the location for the virtual sensor. The training engine may randomly select the location or selects the location based on one or more elements of interest in the second scene.

In an implementation, a system for generating training data for machine learning classifiers is provided. The system comprises: at least one computing device; and a training engine that: receives a scene, wherein the scene includes a plurality of elements, and each element is associated with a label; changes a lighting characteristic of the scene; changes a characteristic of one or more elements of the plurality of elements of the scene; adds a new element to the plurality of elements of the scene, wherein the new element is associated with a label; places a virtual sensor in a location of the scene; generates sensor data for the virtual sensor based on the location of the virtual sensor in the scene; and generates training data based on the generated sensor data and the labels associated with the elements of the plurality of elements of the scene.

Implementations may include some or all of the following features. The training engine may further train a machine learning classifier using the generated training data. The training engine that changes the lighting characteristic of the scene comprises the training engine performing one or more of changing a temperature, a location, a shape, and an intensity of a light source associated with the scene, removing a light source from the scene, and adding a light source to the scene. The training engine that changes a characteristic of one or more elements of the plurality of elements of the scene may include the training engine that changes one or more of a size, a location, an orientation, a color, and a texture of one or more elements of the plurality of elements of the scene. The training engine that adds a new element to the plurality of elements of the scene may include the training engine that randomly adds a new element to the plurality of elements of the scene. The virtual sensor may be a camera.

In an implementation, a method for generating training data for machine learning classifiers is provided. The method includes: receiving a scene by a computing device, wherein the scene includes a plurality of elements, and each element is associated with a label; changing a lighting characteristic of the scene by the computing device; changing a characteristic of one or more elements of the plurality of elements of the scene by the computing device; adding a new element to the plurality of elements of the scene by the computing device, wherein the new element is associated with a label; generating training data based on the scene by the computing device; and providing the generated training data.

Implementations may include some or all of the following features. The method may further include training a machine learning classifier using the training data. The method may further include: placing a virtual sensor in a location of the scene; generating sensor data for the virtual sensor based on the location of the virtual sensor in the scene; and generating the training data based on the generated sensor data and the labels associated with the elements of the plurality of elements. Changing the lighting characteristic of the scene may include one or more of changing a temperature, a location, a shape, and an intensity of a light source associated with the scene, removing a light source from the scene, and adding a light source to the scene. Changing a characteristic of one or more elements of the plurality of elements of the scene may include changing one or more of a size, a location, an orientation, a color, and a texture of one or more elements of the plurality of elements of the scene. Adding one or more elements to the plurality of elements may include randomly adding the one or more elements to the plurality of elements.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for generating training data for machine learning classifiers, the system comprising:
   at least one computing device; and
   a training engine that:
      receives a first virtual scene, wherein the first virtual scene includes a plurality of elements, and each element is associated with a label;
      generates a second virtual scene from the first virtual scene by:
         removing a light source from the first virtual scene to change a lighting characteristic of the first virtual scene;
         adding one more elements to the plurality of elements of the first virtual scene to at least partially obscure an element of interest of the plurality of elements; and
         changing a characteristic of one or more elements of the plurality of elements of the first virtual scene;
      generates training data from the second virtual scene; and
      trains a machine learning classifier using the generated training data.

2. The system of claim 1, wherein changing a lighting characteristic of the first virtual scene further comprises one or more of changing a temperature, a location, a shape, and an intensity of a light source associated with the first virtual scene.

3. The system of claim 1, wherein changing a characteristic of one or more elements of the plurality of elements of the first virtual scene comprises changing one or more of a size, a location, an orientation, a color, and a texture of one or more elements of the plurality of elements of the first virtual scene.

4. The system of claim 1, wherein adding one or more elements to the plurality of elements of the first virtual scene comprises randomly adding the one or more elements to the plurality of elements of the first virtual scene.

5. The system of claim 1, wherein the training engine that generates the training data from the generated second virtual scene comprises the training engine that:
   places a virtual sensor in a location in the second virtual scene;
   generates sensor data for the virtual sensor based on the location of the virtual sensor in the second virtual scene; and
   generates the training data using the sensor data and the labels associated with the elements of the plurality of elements of the second virtual scene.

6. The system of claim 5, wherein the virtual sensor is a camera.

7. The system of claim 5, wherein the training engine selects the location for the virtual sensor.

8. The system of claim 7, wherein the training engine randomly selects the location or selects the location based on one or more elements of interest in the second virtual scene.

9. A system for generating training data for machine learning classifiers, the system comprising:
   at least one computing device; and
   a training engine that:
      receives a virtual scene, wherein the virtual scene includes a plurality of elements, and each element is associated with a label;
      changes a lighting characteristic of the virtual scene by removing a light source from the virtual scene;
      changes a characteristic of one or more elements of the plurality of elements of the virtual scene;
      adds a new element to the plurality of elements of the virtual scene, wherein the new element is associated with a label;
      places a virtual sensor in a location of the virtual scene to maximize a number of elements of interest in the virtual scene that are detectable by the virtual sensor;
      generates sensor data for the virtual sensor based on the location of the virtual sensor in the virtual scene; and
      generates training data based on the generated sensor data and the labels associated with the elements of interest in the virtual scene detected by the virtual sensor.

10. The system of claim 9, wherein the training engine further trains a machine learning classifier using the generated training data.

11. The system of claim 9, wherein the training engine that changes the lighting characteristic of the virtual scene comprises the training engine further performing one or more of changing a temperature, a location, a shape, and an intensity of a light source associated with the virtual scene.

12. The system of claim 9, wherein the training engine that changes a characteristic of one or more elements of the plurality of elements of the virtual scene comprises the training engine that changes one or more of a size, a location, an orientation, a color, and a texture of one or more elements of the plurality of elements of the virtual scene.

13. The system of claim 9, wherein the training engine that adds a new element to the plurality of elements of the virtual scene comprises the training engine that randomly adds a new element to the plurality of elements of the virtual scene.

14. The system of claim 9, wherein the virtual sensor is a camera.

15. A method for generating training data for machine learning classifiers, the method comprising:
   receiving a virtual scene by a computing device, wherein the virtual scene includes a plurality of elements, and each element is associated with a label;
   changing a lighting characteristic of the virtual scene by removing a light source from the virtual scene by the computing device;
   changing a characteristic of one or more elements of the plurality of elements of the virtual scene by the computing device;
   adding a new element to the plurality of elements of the virtual scene to at least partially obscure an object of interest by the computing device, wherein the new element is associated with a label;
   generating training data based on the virtual scene by the computing device; and
   providing the generated training data.

16. The method of claim 15, further comprising training a machine learning classifier using the generated training data.

17. The method of claim 15, further comprising:
   placing a virtual sensor in a location of the virtual scene;
   generating sensor data for the virtual sensor based on the location of the virtual sensor in the virtual scene; and
   generating the training data based on the generated sensor data and the labels associated with the elements of the plurality of elements.

18. The method of claim 15, wherein changing the lighting characteristic of the virtual scene further comprises one or more of changing a temperature, a location, a shape, and an intensity of a light source associated with the virtual scene.

19. The method of claim 15, wherein changing a characteristic of one or more elements of the plurality of elements of the virtual scene comprises changing one or more of a size, a location, an orientation, a color, and a texture of one or more elements of the plurality of elements of the virtual scene.

20. The method of claim 15, wherein adding one or more elements to the plurality of elements comprises randomly adding the one or more elements to the plurality of elements.

* * * * *